Feb. 23, 1926.
P. E. BÉAL ET AL
ELECTROVIBRATOR
Filed Oct. 28, 1925
1,573,797
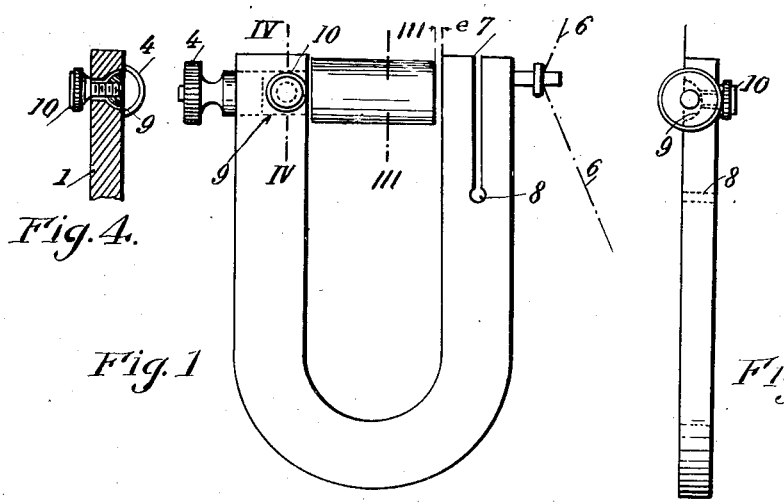
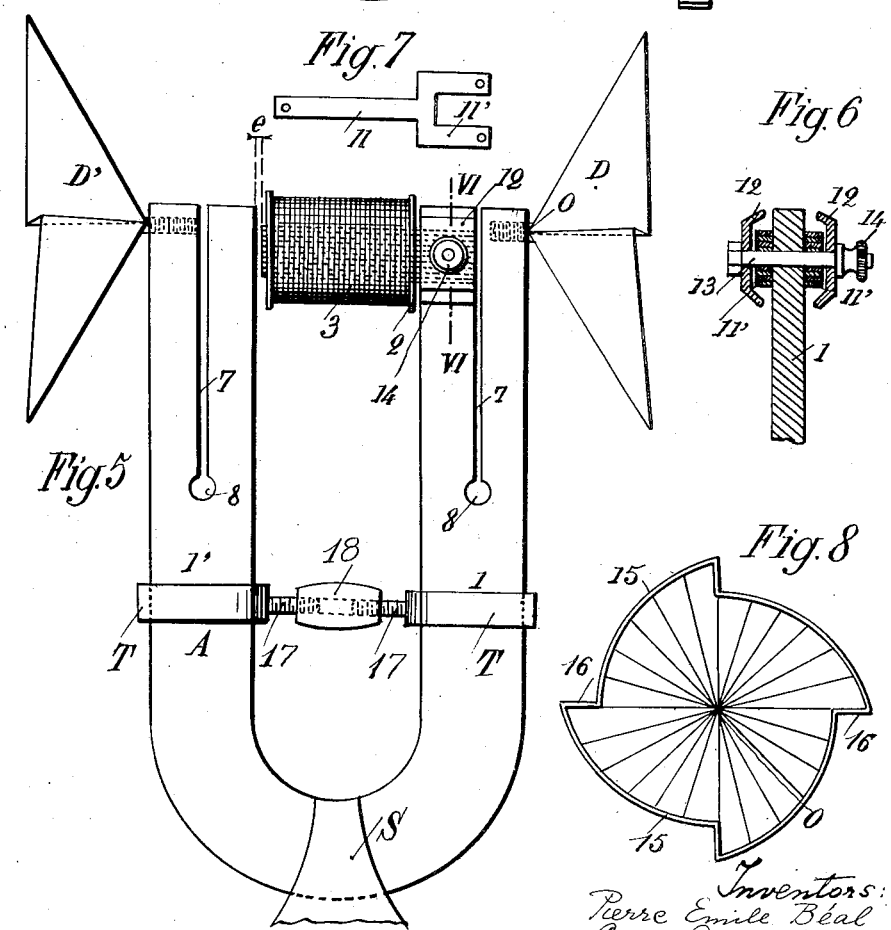
Inventors:
Pierre Emile Béal
Louis Lucien Edouard Fanet
by Emery, Booth, Janney & Varney,
Attorneys Patented Feb. 23, 1926.

1,573,797

UNITED STATES PATENT OFFICE.

PIERRE EMILE BÉAL AND LOUIS LUCIEN EDOUARD FANET, OF LEVALLOIS-PERRET, FRANCE.

ELECTROVIBRATOR.

Application filed October 28, 1925. Serial No. 65,413.

*To all whom it may concern:*

Be it known that PIERRE EMILE BÉAL, citizen of the French Republic, residing at Levallois-Perret, Seine, France, 36 Rue du President Wilson, and LOUIS LUCIEN EDOUARD FANET, citizen of the French Republic, residing at Levallois-Perret, Seine, France, 2 Rue Louis-Blanc, have invented an Improvement in Electrovibrators, of which the following description, in connection with the accompanying drawings, is a specification, like characters on the drawings representing like parts.

The object of the present invention is to provide an electro-vibrator adapted to be used especially but not exclusively as a telephonic receiver and more particularly as a loud speaker for wireless transmissions.

This electro-vibrator comprises a magnet, such as a permanent magnet having at least one elongated bar or branch adapted to vibrate transversely such as for instance a permanent magnet with two branches in horse shoe shape, said magnet comprising at least one pair of opposite magnetic poles in juxtaposition and separated by a small air-gap so that the magnetic flux of the magnet will pass from one pole to the other with appropriate intensity; the magnet carries furthermore in one or several points of the magnetic circuit one or several windings for the modulated electric current, the vibrating branch or at least one of the vibrating branches forms or carries a diffusor or an enlarged surface adapted to insure the transformation of the vibrations between said branch and the surrounding atmosphere. When the apparatus acts as telephonic receiver the passage of the modulated reception current, in said windings creates an additional modulated flux the addition of which to the inherent magnetic flux of the magnet causes a direct vibration of the branch or branches of the magnet, and the vibrations are transmitted into the atmosphere by the diffusor or the enlargement of the surface of the vibrating branch. When used as transmitting apparatus, the vibrations, due to the diffusor or the enlarged surface of the branch of the magnet the vibrations are directly transmitted to the surrounding atmosphere, and the modulated variations of the air-gap, and, under the influence of the magnetic flux create a modulated electric transmission current in the windings.

The invention furthermore relates to certain improved devices the main object of which is to obtain a greater purity, truer reproduction and a greater intensity of the emitted sounds when using the apparatus for instance as a telephonic receiver and, more especially, as a loud speaker. These improved devices comprise the following means which may be applied either singly or partially or totally combined. Establishment and utilization of a magnet of a particular shape with flat branches presenting a great moment of inertia in the plane of the main vibrations.

The narrow ends of said branches are arranged in the plane of the principal vibrations in order to render these branches as rigid as possible, at least at their base, so as to eliminate the emission of hollow sounds. The moment of inertia in the curved portion of the magnet is increased by increasing the thickness or width or by providing ribs, etc., at the center portion of the rectilinear or otherwise shaped bar to the same end as that above mentioned. One or more slots are provided in the vibrating branch, such as a transverse slot of appropriate length terminating, if desired, in an appropriately dimensioned hole, to provide for a greater purity of sound. The core of the coil receiving the modulated electric reception current is laminated to obtain a great increase in power, sensitiveness and purity, and eliminating the humming sound of the apparatus when forcing the latter. Our improved electro-vibrator preferably comprises a magnet with two vibrating branches which may be similarly shaped, both branches being provided with a diffusor of any desired construction but preferably the same for both branches. This arrangement greatly increases the sound capacity and exerts an equilibrating action of the effects which may result when using two symmetrical branches. Also our invention contemplates the provision of an improved diffusor comprising a mouthpiece with a helicoidal surface that is a generating circle leaning against one or several spiral curves so as to transmit the vibrations along the appropriate directions and thus eliminate certain parasitic vibrations. This arrangement provides for a greater purity of sound.

The nature, characteristic features and scope of the invention will be more fully understood from the following description and the appended claims taken in connection with the accompanying drawing forming part thereof and which represents two forms of the invention as applied to loud speakers.

Figs. 1 to 4 illustrate one form of the invention and of which Fig. 1 is an elevation, Fig. 2 a side-view and Figs. 3 and 4 a detail section along lines III—III and IV—IV of Fig. 1. Figs. 5 to 8 illustrate another more perfected form of the invention, of which Fig. 5 shows a front view of the magnet with two vibrating branches and two symmetrically arranged sound diffusor horns; Fig. 6 is a section through VI—VI (Fig. 5) and shows the lamination of the core; Fig. 7 is a plan view of one leaf of the core and Fig. 8 is a front view of the special diffusor.

The loud speaker shown comprises a permanent magnet A with two branches 1—1' of horse-shoe shape, an additional pole in soft iron is mounted transversely at the end of one of the branches 1 and is provided with a coil 3 for the admission of the modulated electric receiving current. The air gap $e$ is sufficiently small to allow the passage of the constant magnetic flux of the magnet from one pole to the other with sufficient intensity and under these conditions the modulated additional flux created by the passage of the current of the receiving apparatus in the coil 3 causes the two branches or at least one of these to vibrate sonorously; the diffusion of the sound is effected by a diffusor D, the latter having no vibrating diaphragm. The air-gap $e$ is preferably adjustable. To this effect the core 2 (Figs. 1 to 4) is provided with an extension 4 which is adapted to slide in a corresponding slot provided in the branch of the magnet 1 and which is terminated by a threaded rod and a nut with milled head; after having adjusted the air gap by means of the screw 4, the core 2 is held in place by a thumb screw 10 which passes freely through a hole provided in the branch of the magnet 1 and a threaded hole in the extension 9 (Fig. 4).

According to the invention, the greatest moment of inertia of the branches 1—1' of the magnet lies in the plane of the curve of the horse shoe. These branches may, for instance, be flat in said plane, or in other words, their dimension in this plane is larger as seen from the front than that seen from the side (Figs. 2 or 6) in the perpendicular plane, such that the branches present, at their base at least, a great rigidity in the direction of the vibrations. Due to this arrangement the hollow sounds are eliminated which occur when using a magnet having the large sectional dimension of the branches in the perpendicular plane to the main vibrating plane. To the same effect and in order to compensate the weakening due to the reduction of the section at its outer portion and the resulting loss of rigidity caused by the curving of the metal, it is preferable to increase the section of the metal bar from which the magnet is to be made in its centre before bending, either by increasing the thickness or width of the metal or by providing reinforcing ribs or by any other appropriate means by which the moment of inertia of the section of the curved part will be increased.

The soft iron core 2 of the coil 3 is likewise flattened out as may be seen in Fig. 3; this flattening produces a greater purity of sound.

One characteristic of the invention consists in providing in the vibrating branch a slot 7 of appropriate length and which terminates in a hole 8, said slot being arranged perpendicularly to the vibrating plane. This arrangement causes the emission of a sound of greater purity by the loud speaker; said slot may be provided in either one or in both branches. Its length as well as the dimensions of the hole may best be determined by experience according to sound scale for which the sound purity appears best appropriate.

Figs. 5 to 7 show the characteristics of the magnet with flat branches, slotted transversely to their length, a hole being provided at the end of the slot; the core is likewise flattened out. But in this example the core 2 is laminated and comprises a series of superposed sheets separated by an isolating material in the usual manner. The lamination of the core serves in the known manner to reduce the losses but in this particular application it also increases greatly the sonorousness, the sensitiveness and the purity of sound and it eliminates the humming sounds which are likely to occur by forcing the apparatus.

The lamination is preferably applied in the perpendicular direction to the length of the branches of the magnet. Each segment has the shape shown in Fig. 7 with part 11 forming the core $2^a$ of the coil 3, and a fork 11' by which the core is fastened; said fork 11' is arranged so as to fit closely to branch 1 of the magnet to which the core is fastened; the core is fastened by means of two clips 12 which engage the laminated portion of the fork 11' and is held in place by a bolt 13 which passes through the branch of the magnet and is tightened by means of a nut with milled head. It is to be noted that the laminated core, formed by piling up the parts 11 of the segments presents, as in the preceding case, a flattened shape in the same direction as the branches of the magnet.

In Fig. 5 both branches 1—1' of the magnet are identical (with the exception that the core of the single coil 3 is carried by only one of the branches). Both branches are slotted and provided with a hole at the end of the slot and each carries a diffusor D or D' respectively. If the magnet is mounted i. e. on its support at its bent portion both branches adopt vibrations of practically the same value. In providing a double diffusor, one on each branch not only a very great increase in sonorousness of the apparatus is realized but also an equalization of the effects, which may result from the use of two symmetrical branches. The slight commotions which may result when using only one single branch for the diffusor are thus eliminated.

The diffusor shown in Figs. 5 and 8 presents one or several helicoidal surfaces, i. e. surfaces in which the generating circle starts in one or several spiral curves 15 in such manner as to effect the interruption of continuity between the parts 16 and the surfaces. This interruption of continuity does not interfere with the transmission of the vibrations in the appropriate directions but it eliminates the diffusion of certain parasitic vibrations and thus increases the purity of sound.

The means for controlling the air-gap e are not represented in Fig. 5 but it is clear that such control may be effected; for instance, by means of an appropriate device sliding between the laminated core and the branch of the magnet by which the core may be removed from said branch; or preferably by means of a cross-bar T connecting both branches of the magnet above the curved portion. The cross-bar (Fig. 5), may take any appropriate form but consists preferably of two parts, each fastened at an appropriate point of the branches, two opposite parts 17 and 17' respectively, having opposite threads and adapted to be regulated by an adjusting nut 18.

It is understood that the electro-vibrator is normally carried on a support represented schematically by S (Fig. 5) to which support the electro-vibrator is fastened at a convenient point, i. e. in a vibration node, that is, in a point where no vibrations occur, as for instance in the case of a magnet with two branches in horse shoe shape, in the curved portion of the horse shoe.

In order to render both branches absolutely symmetric, two coil cores one for each branch may be provided with either a single air-gap between the two cores or with two air-gaps between each core and the opposite branch respectively, or with a single coil core carried by a separate support between both vibrating branches. In the latter case the control of the air-gap may be effected by means of a cross-bar as described above.

The term "diffusor" used in the following claims is understood to designate any enlarged surface fastened to the vibrating branch and made out of any desired material or established by an enlargement of said branch itself presenting a sufficient surface for the transmission of the vibrations between the branch and the surrounding atmosphere.

The term "telephonic" as used in the claims hereafter is to be taken in the broadest adaptation of the word, i. e. it is intended to include all transmissions of modulated vibrations either by regular or by wireless telephony, by radio transmissions, etc.

What we claim and desire to secure by Letters Patent is:—

1. An electro-vibrator to be used more particularly as telephonic receiver or transmitter comprising a magnet having at least one elongated branch adapted to vibrate transversely under audible frequencies, juxtaposed opposite poles separated by an appropriate air-gap, at least one winding for electric current embracing the magnetic circuit, and, directly carried by said branch, a diffusor to transmit the vibrations between said branch and the surrounding atmosphere, said branch having at least one slot disposed longitudinally to the branch and transversely to the vibrating plane.

2. An electro-vibrator to be used more particularly as a telephonic receiver or transmitter comprising a magnet having at least one elongated branch adapted to vibrate transversely under audible frequencies, juxtaposed opposite poles separated by an appropriate air-gap, said branch being designed so that its sections will present a high moment of inertia in the plane of the main vibration, at least one winding for electric current embracing the magnetic circuit, and, directly carried by said branch, a diffusor to transmit the vibrations between said branch and the surrounding atmosphere and said branch being flattened out in the plane of the main vibration and provided with at least one slot disposed longitudinally to the branch and transversely to the vibrating plane.

3. An electro-vibrator to be used more particularly as a telephonic receiver or transmitter comprising a magnet with two branches in horse shoe-shape at least one of said branches being adapted to vibrate transversely to the plane of the horse shoe, said branch being flattened out in the plane of the horse shoe and having at least one slot disposed transversely to said plane, juxtaposed opposite poles separated by an appropriate air-gap, at least one winding for electric current embracing the magnetic circuit, and, directly carried by said branch, a diffusor carried directly by said branch of the magnet, and a support carrying the magnet at a suitable point.

4. An electro-vibrator to be used more particularly as a telephonic receiver or transmitter comprising a magnet with two branches in horse-shoe-shape at least one of said branches being adapted to vibrate transversely to the plane of the horse shoe, said branch being flattened out in the plane of the horse shoe and provided at its outer end with at least one longitudinal slot running transversely to the plane of the horse shoe, juxtaposed opposite poles separated by an appropriate air-gap, at least one winding for electric current embracing the magnetic circuit, and, directly carried by said branch, a diffusor carried directly by said branch of the magnet, and a support carrying the magnet at a suitable point.

5. An electro-vibrator to be used more particularly as a telephonic receiver or transmitter comprising a magnet having at least one elongated branch adapted to vibrate transversely under audible frequencies said branch having at least one slot terminating at its inner end in a drilled hole of a greater diameter than the width of the slot, juxtaposed opposite poles separated by an appropriate air-gap, at least one winding for electric current embracing the magnetic circuit, and, directly carried by said branch, a diffusor to transmit the vibrations between said branch and the surrounding atmosphere.

6. An electro-vibrator to be used more particularly as a telephonic receiver or transmitter comprising a magnet having at least one elongated branch adapted to vibrate transversely under audible frequencies, said branch having at least one slot transversely to the vibrating plane and terminating at its inner end in a drilled hole of a greater diameter than the width of the slot, juxtaposed opposite poles separated by an appropriate air-gap, at least one winding for electric current embracing the magnetic circuit, directly carried by said branch, a diffusor to transmit the vibrations between said branch and the surrounding atmosphere.

7. An electro-vibrator to be used more particularly as a telephonic receiver or transmitter comprising a magnet with two branches in horse shoe-shape at least one of said branches being adapted to vibrate transversely to the plane of the horse shoe and having a slot therein, said slot terminating at its inner end in a drilled hole of a greater diameter than the width of the slot, juxtaposed opposite poles separated by an appropriate air-gap, at least one winding for electric current embracing the magnetic circuit, and, directly carried by said branch, a diffusor carried directly by said branch of the magnet, and a support carrying the magnet at a suitable point.

8. An electro-vibrator to be used more particularly as a telephonic receiver or transmitter comprising a magnet with two branches in horse shoe-shape at least one of said branches being adapted to vibrate transversely to the plane of the horse shoe, said branch being flattened out in the plane of the horse shoe and provided at its outer portion with at least one longitudinal slot disposed transversely to the plane of the horse shoe, juxtaposed opposite poles separated by an appropriate air-gap at least one laminated pole-core with at least one winding.

9. An electro-vibrator to be used more particularly as a telephonic receiver or transmitter comprising a magnet with two branches in horse shoe-shape at least one of said branches being adapted to vibrate transversely to the plane of the horse shoe, said branch being flattened out in the plane of the horse shoe and provided at its outer portion with at least one longitudinal slot disposed transversely to the plane of the horse shoe, said slot being terminated at its inner end by a hole of a larger width, juxtaposed opposite poles separated by an appropriate air-gap at least one laminated pole-core with at least one winding.

10. An electro-vibrator to be used more particularly as a telephonic receiver or transmitter comprising a magnet with two branches in horse shoe-shape at least one of said branches being adapted to vibrate transversely to the plane of the horse shoe, said branch being flattened out in the plane of the horse shoe and provided at its outer portion with at least one longitudinal slot disposed transversely to the plane of the horse shoe, juxtaposed opposite poles separated by an appropriate air-gap at least one laminated pole-core with at least one winding, and a diffusor carried directly on said branch for the transmission of the vibrations between this branch and the surrounding atmosphere.

11. An electro-vibrator to be used more particularly as a telephonic receiver or transmitter comprising a magnet with two branches in horse shoe shape flattened out in the plane of the horse shoe each of said branches having a slot running longitudinally to one branch and transversely to said plane, at least one laminated core with wiring, juxtaposed opposite poles separated by an appropriate air-gap, one diffusor on each branch and a support carrying the magnet.

12. Electro-vibrator to be used more particularly as telephonic receiver or transmitter comprising a magnet with two branches in horse shoe shape flattened out in the plane of the horse shoe each of said branches having a slot running longitudinally to one branch and transversely to said plane, at least one laminated core with wiring, juxtaposed opposite poles separated by an appropriate air-gap, the disposition being substantially symmetrical to the median perpendicular plane of the horse shoe, one diffusor on each branch and a support carrying the magnet in its curved portion.

13. An electro-vibrator comprising, in combination, a horse shoe magnet having branches each provided with an elongated slot extending from an intermediate portion through the end thereof, an electric coil operatively interposed between the branches and a diffusor carried by at least one of said branches of the magnet.

14. In an electro-vibrator, a horse shoe magnet having a diffusor connected to at least one of its branches, a magnetic coil arranged between the branches and a soft iron core for said coil including a series of superposed strips each having a fork at one end to straddle one branch of the magnet, and means to secure said forked ends relatively to said branch.

15. In an electro-vibrator, a horse shoe magnet having diffusors secured to its branches, a magnetic coil arranged between the branches and a laminated core for said coil including a plurality of soft iron strips, each having a forked end to embrace one branch of the magnet and a clip device for securing said forked ends to said branch.

In testimony whereof, we have signed our names to this specification.

PIERRE EMILE BÉAL.
LOUIS LUCIEN EDOUARD FANET.